Aug. 23, 1960  R. M. PAGE  2,950,474
MISSILE GUIDING SYSTEM
Filed Oct. 27, 1949  3 Sheets-Sheet 1
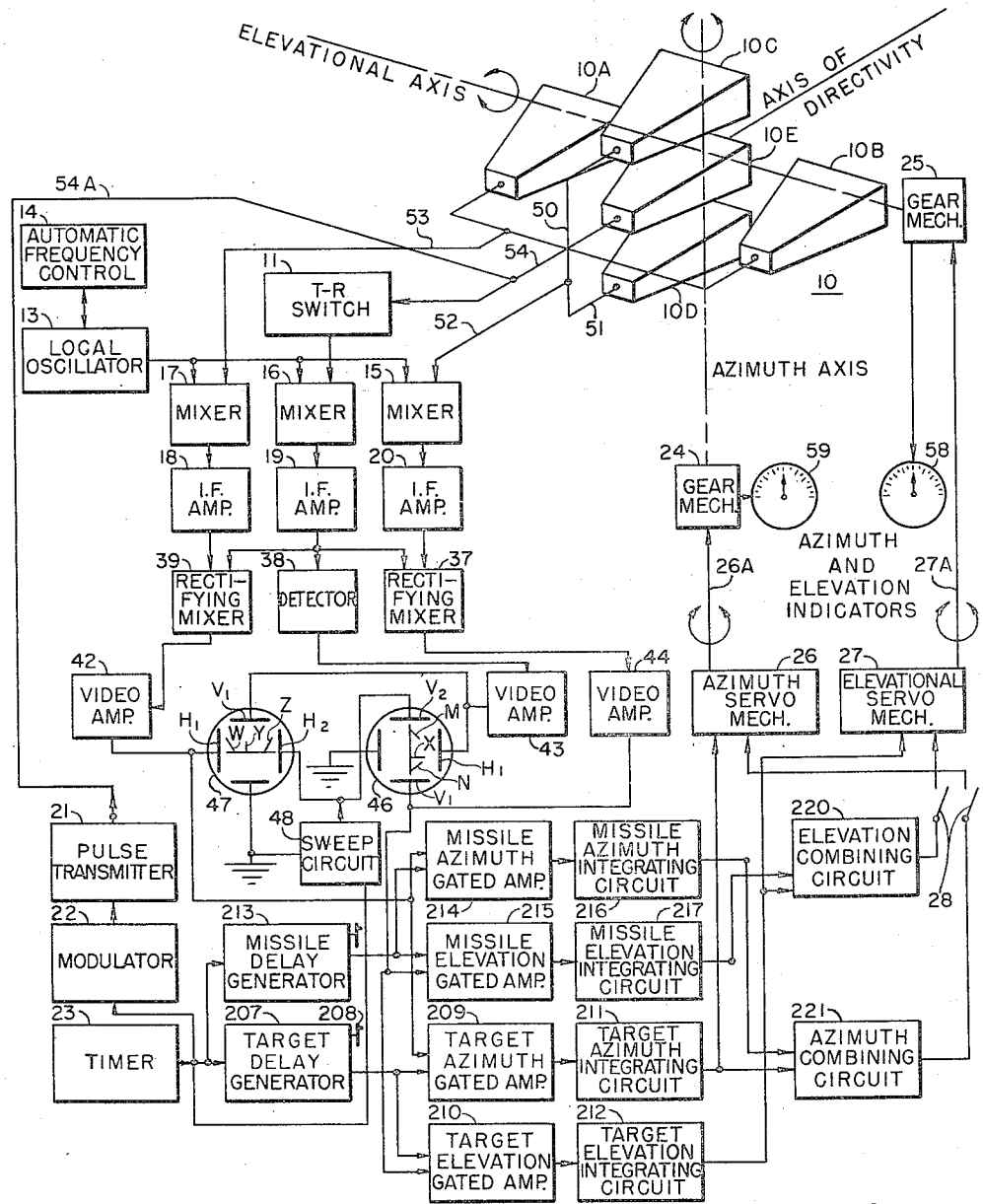
Inventor
ROBERT M. PAGE
By
M. O. Hayes
ATTORNEY

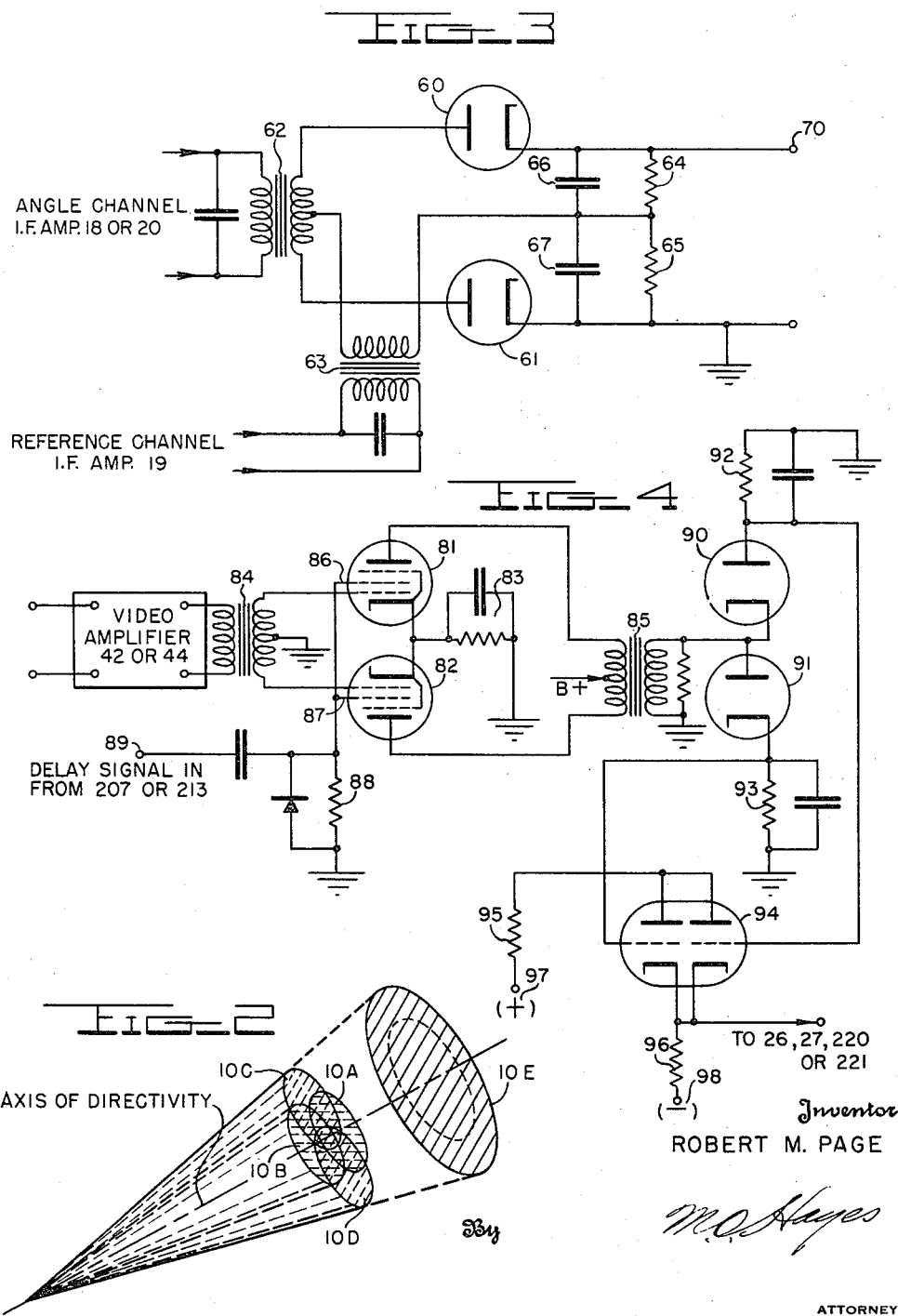

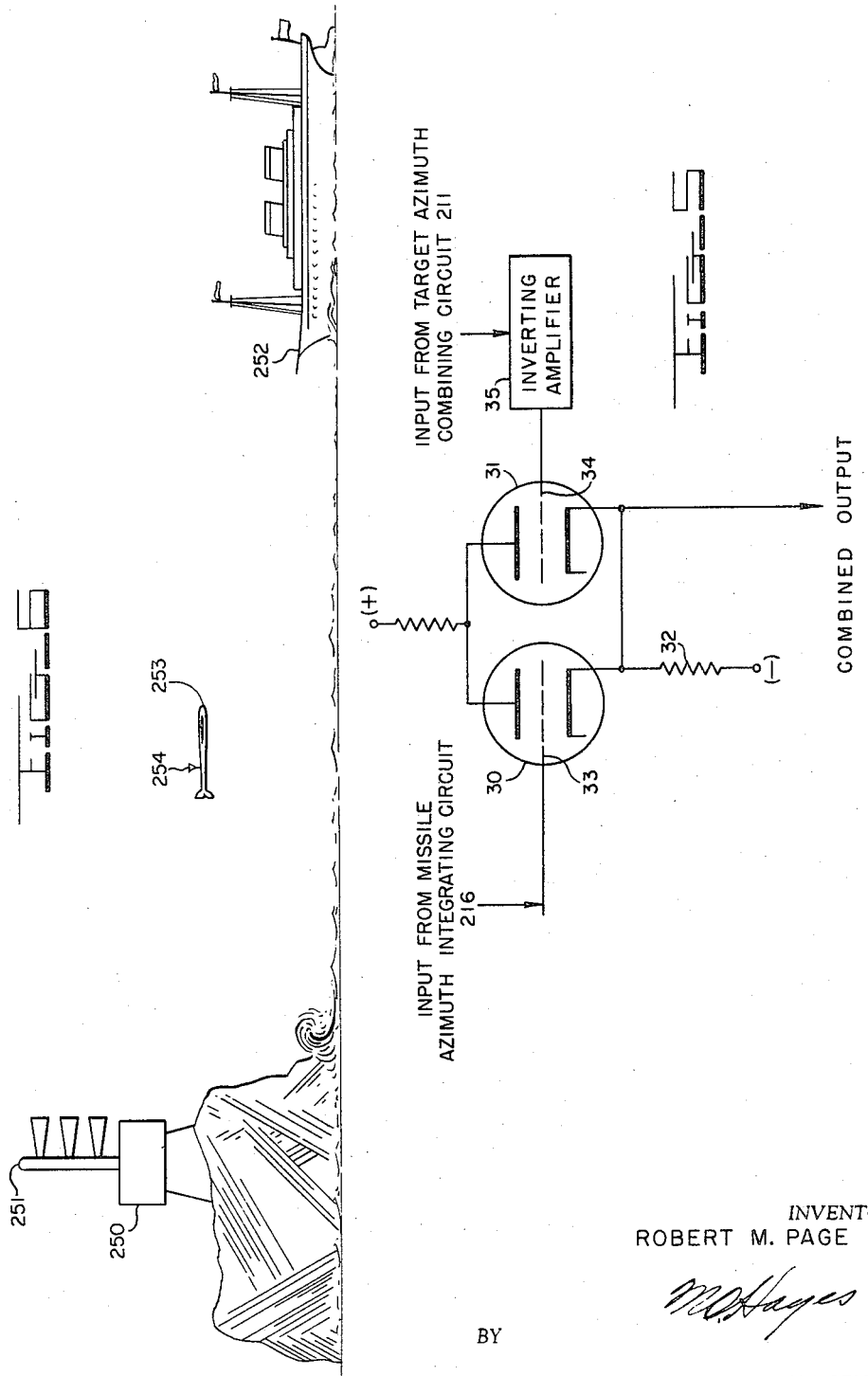

United States Patent Office 2,950,474
Patented Aug. 23, 1960

2,950,474

MISSILE GUIDING SYSTEM

Robert M. Page, Camp Springs, Md.

Filed Oct. 27, 1949, Ser. No. 123,871

5 Claims. (Cl. 343—7)

(Granted under Title 35, U.S. Code (1952), sec. 266)

This invention relates to missile guiding systems in general and in particular to guiding with radar systems having a high degree of bearing and elevation accuracy.

My co-pending application Serial Number 784,209 filed November 5, 1947, entitled "Radar Locator Systems," now Patent No. 2,929,056, describes a radar system which permits such a remarkable degree of freedom from bearing and elevation errors due to lag in antenna follow-up as to lend itself ideally to incorporation into a missile guiding system. With such a guiding system, using the apparatus of the present invention it is entirely possible to electrically determine angular differences as small as five seconds of angle between the bearings or elevations of two distant objects. Such measurement is almost completely divorced from error introduced by servo linkage between the radar indicator and the antenna. This type of error is particularly objectionable when conventional radar systems are used with rapidly moving objects.

It is an object of the present invention to provide a missile guiding system capable of a high degree of accuracy of control.

Another object of the present invention is to provide a missile guiding system wherein measurement of differences in angular relationships between missile and target positions (bearing and elevation) can be made with freedom from tracking errors due to inaccuracy in the movement of the antenna mount.

Other and further objects and features of the present invention will become apparent upon a careful consideration of the accompanying discussion and drawings in which:

Fig. 1 is a schematic diagram of a missile guiding system possessing a high degree of angular accuracy;

Fig. 2 is an illustration of one suitable type of antenna field pattern useful in practicing the present invention;

Figs. 3, 4 and 5 are circuit diagrams illustrating in detail certain of the components shown in block form in Fig. 1;

Fig. 6 shows a typical arrangement of control station, missile, and target suitable for illustrating the present invention.

In accordance with the fundamental teachings of the present invention, a missile guiding system is provided embodying in part features of my previously identified copending application to derive information regarding the bearing and elevation of both a missile and its target practically simultaneously without requiring motion of the radar antenna and to provide output signals relative to elevation and/or bearing differences between missile and target which can be employed to direct the missile travel.

Reference is now made to Fig. 1 which shows a missile tracking and guidance system as employed in conjunction with a radar system of the foregoing type. The overall guidance system includes a plurality of highly directional antenna elements such as the horns 10–A, 10–B, 10–C, 10–D and 10–E. Antenna element 10–E is fundamentally a transmitter element radiating energy produced by pulse transmitter 21 however it also receives return energy which is applied through the transmit-receive switch 11 to mixer 16 for heterodyne action with a signal from the local oscillator 13 whereby is produced an intermediate frequency signal for amplification by intermediate frequency amplifier 19, detection by detector 38, amplification by video frequency amplifier 43, and display on the indicators 46, 47.

The remaining antenna elements 10–A, 10–B, 10–C and 10–D are mounted with slightly divergent axes of directivity. The entire antenna structure is rigidly aligned and is provided with angular motion in the vertical and in the horizontal plane by a suitable mechanism. The field patterns of the component elements of antenna 10 are in general similar to those indicated by the correspondingly numbered cones of Fig. 2. The up and down receiving elements 10–C and 10–D of the antenna 10 in Fig. 1 provide vertically disposed divergent response patterns 10–C and 10–D in Fig. 2, and the right and left receiving elements 10–B and 10–A of antenna 10 provide horizontally disposed diverging response patterns 10–B and 10–A. The transmitting element 10–E provides a beam pattern which is centrally disposed with respect to the other response patterns and as shown may have a somewhat wider range of directivity than the other antenna elements.

Signals received by the up and down (elevation) antenna elements 10–C and 10–D are combined in phase opposition at the input to transmission channel 52 of Fig. 1 by delivery through the transmission paths 50 and 51 which are of unequal length. Such combination in phase opposition can be affected by making one of the transmission means 50 or 51 an odd integral number of ½ wave lengths longer than the other, as indicated generally in Fig. 1 or by other phase reversing devices now well known to the art. The resultant energy signal appearing in channel 52 is applied as one input to the mixer 15. Mixer 15 also receives the oscillations produced by local oscillator 13 to produce heterodyne signals at a frequency suitable for amplification by the intermediate frequency amplifier 20.

Similarly, signals received by the right-left (azimuth) receiving elements 10–B and 10–A are combined in phase opposition appearing in channel 53 and are delivered to mixer 17 wherein they are also combined with signals from the local oscillator 13 to produce signals of a frequency suitable for amplification by the intermediate frequency amplifier 18.

Whenever the antenna assembly 10 is oriented in such direction that an energy reflecting object is located on the axis of directivity thereof, signals of equal amplitude and of the same phase will be received by each element of the up-down, right-left antenna pairs 10–C, 10–D and 10–B, 10–A. With combination of these similar amplitude signals after 180° phase reversal, complete cancellation with absence of output signals in the channels 52 and 53 will result. On the other hand, as for example when the reflecting object is located to the right of axis of directivity of the antenna, the signal picked up by the right element 10–B will be greater in amplitude than that picked up by the left element 10–A so that upon combination, cancellation will not occur and a signal having a first phase with respect to the transmitted energy will appear in the transmission channel 53. If a reflective object is located to the left of the axis of directivity, the amplitude of the signal output from left element 10–A is greater than the amplitude of the signal from right element 10–B so that a resultant signal having a second phase with respect to the transmitted signal is produced.

The same sort of combination in a different channel 52 with resulting output signals having first or second phase relationships with respect to the transmitted signal will exist when a target is above or below the axis of directivity of the antenna. It is these combined signals that are delivered to mixers 15 and 17 and subsequently to intermediate frequency amplifiers 18 and 20.

The amplified intermediate frequency output signals from each of the angular channel I.F. amplifiers 20 and 18 are applied to separate mixing stages 37 and 39 respectively which are phase sensitive detectors. Each mixing stage (37 and 39) also receives the reference channel I.F. output from amplifier 19 to provide output dependent upon phase and amplitude relationships between the input signals. Details of typical rectifying mixer circuits are shown in Fig. 3 and subsequently will be described further.

The resultant signals from the rectifying mixers have polarities indicative of the sense of the angular displacement of a reflective object from the antenna axis of directivity and amplitudes proportional to the degree of this angular displacement. In the case of pulse modulation as in a pulse echo system, these resultant signals will either be positive or negative video pulses depending on the sense of the displacement of the reflective object from the axis of directivity of the antenna system 10.

The output of the phase sensitive azimuth rectifying mixer 39 is applied to an azimuth video amplifier 42. The output of the phase comparing elevation rectifying mixer 37 is applied to an elevation video amplifier 44. A third video amplifier 43 receives the pulse output from the reference signal detector 38.

To indicate the position of energy reflecting objects the pulse output from the azimuth video amplifier 42 is applied to one deflecting electrode $H_1$ of a range and azimuth cathode ray tube indicator 47. Similarly the pulse output from the elevation video amplifier 44 is supplied to one vertical deflecting electrode $V_1$ of range and elevation cathode ray tube indicator 46. The video output of the reference channel video amplifier 43 is applied in parallel to the deflecting plates $H_1$ of tube 46 and $V_1$ of tube 47. The purpose of indicator tubes 46, 47 as just mentioned is to indicate range and angular displacement of an energy source with respect to the antenna axis of directivity. To this end a saw-tooth signal generator or sweep circuit indicated at 48 is added and arranged to apply a horizontal sweep to deflection plate $H_2$ of azimuth indicator 47 and a vertical sweep to the deflection plate $V_2$ of elevation indicator 46. The sweep signals from generator 48 produce a linear time base on the indicator tubes 46, 47 recurrently initiated with each pulse emitted from transmitter 21. In the case of the azimuth indicator 47 this sweep is horizontal from left to right while for the elevational indicator 46 it is vertical sweeping upward from the bottom.

Signals returned by objects located on the axis of directivity will effect only the video amplifier 43 cancelling for other video amplifiers 42 and 44 and hence will appear as vertical pips on indicator 47 and horizontal pips on indicator 46.

Signals received from objects displaced with respect to the axis of directivity of the antenna may appear in both video amplifiers 42 and 44 as well as in the output of amplifier 43 and will produce pips which are inclined with respect to the vertical in indicator 47 or with respect to the horizontal in indicator 46. The angular displacement of such pips from the vertical or horizontal as the case may be is dependent on the displacement of an object producing energy reflection from the axis of directivity. The direction of displacement of these inclined pips from the vertical or horizontal is indicative of the direction of the reflective object from the axis of directivity. The points at which the sloping pips leave the base horizontal or vertical line is indicative of range to a reflective object and should appear the same distance from the point of sweep initiation on each indicator 46 and 47. Thus for example a signal returned by a first object on the axis of directivity might produce indications on the face of indicators 47 and 46 such as those pips indicated by the letters Y and X respectively which both correspond to the same object. The signals returned by an object to the left of and above the axis of directivity and at shorter range than the first object produce typically the indications of pips W and N. An object to the right of and below the axis of directivity at a greater range than the first object would be indicated by the pips Z and M again which are also returned by an object at a range different from the others.

For automatic antenna tracking of targets in angle, the target gated amplifiers 209 and 210 responsive to received signals from video amplifiers 42 and 44, respectively, as indicated, and gated in time with respect to the transmitter pulse by target delay generator 207, operate through target azimuth integrator circuit 211, target elevation integrator circuit 212, azimuth servo mechanism 26, elevational servo mechanism 27 and gear mechanisms 24 and 25 to position the axis of directivity of the antenna up or down, right or left so that in so far as possible the vertical or horizontal condition of pips on the indicators 47, 46 will be obtained for an energy reflective object at a selected range determined by the target delay generator 207. Failure of the antenna mount to track exactly the motion of the reflective object will be immediately shown by indicators 46 and 47 by variations of the slope of the pips produced by that object caused by signals in the angle video amplifiers 42 and 44. Range selection is accomplished by manual position of a range selector knob 208 for the target delay generator 207. Automatic range follow-up commonly employed in radar systems but not otherwise shown or discussed in this application, may be employed to assist tracking if desired.

For control or direction of a missile, operation with two range gates, one for the missile and one for its target is required. Orientation of the antenna system in azimuth as well as in elevation may be accomplished as just described in accordance with the signals received during the range gate for the target.

Additional signal channels which provide integrated signals proportional to the position of a missile relative to the axis of directivity of the antenna 10 include the missile delay generator 213 which selects the missile range, missile azimuth gated amplifier 214, missile elevation gated amplifier 215, missile azimuth integrator circuit 216 and missile elevation integrator circuit 217. These signal channels similar to those which deliver the antenna tracking signals also provide output signals of the same general character as those delivered to the antenna servo mechanisms 26 and 27. It goes almost without saying that suitable known automatic range tracking techniques may be applied to the missile delay generator 213 to cause this gate signal to track the missile echo.

Elevation combining circuit 220 receives the target elevation integrated signal from circuit 212 and combines with it the missile elevation signal from circuit 217 to derive an output signal proportional to the difference between the signals existant at these two points. Similarly azimuth combining circuit 221 receives target azimuth integrated signals from circuit 211 and missile azimuth integrated signals from circuit 216 to provide azimuth signals again dependent upon the difference between the signals from the two sources. Combining circuits 220 and 221 are differential combining circuits producing D.-C. control signals having a polarity determined by angular differences between the target and missile. As an illustration, a typical combining circuit for the azimuth information is shown in Fig. 5 which has the triode type electron tubes 30, 31 whose cathodes are tied to a single resistance 32. Grid 33 may receive output signals direct from the missile azimuth integrating circuit 216 whereas grid 34 receives signals from the target azimuth combining circuit 211 delivered through the inverting amplifier 35. Amplifier 35 is not intended to provide amplification, its input-output voltage ratio should be unity, it is inserted for signal inversion only and other forms of apparatus producing signal inversion such as a transformer, may be used.

Combined output signals appear across resistance 32 for delivery to the missile control circuits as azimuth signals. Duplicate equipment is employed for the elevation circuits.

The preferred method of control of the radio frequency energy in accordance with these signals for missile direction depends entirely on the type of missile guiding system employed. Several methods would be entirely satisfactory and within the scope of the present invention.

A typical method is indicated in the diagram of Fig. 1 itself wherein the signals from the elevation combining circuit 220 are delivered to the elevation servo mechanism 27 and the signals from the azimuth combining circuit 221 are delivered to the azimuth servo mechanism 26 in the closed position of switches 28. The control signals as delivered to the azimuth and elevation servo mechanism may be made to displace the antenna axis of directivity off of the actual target direction by a small amount when switches 28 are closed. With this type of connection a beam follower missile control is employed, the missile being provided with a known type of control equipment enabling it to alter its course to stay "on" a narrow beam of radio frequency energy directed toward the target. A typical example of a beam follower missile or projectile control system is given in the U.S. Patent 2,579,823 originally filed January 8, 1942, by H. J. Homrighous entitled, System for Controlling the Path of Bombs and Projectiles, and in the parent thereof U.S. Patent 2,432,421 issued December 9, 1947.

Circuit details of suitable rectifying mixer units for blocks 37 and 39 are shown in Fig. 3. Actually two circuits of Fig. 3 are required, one for 37 and one for 39. This circuit is similar in appearance to a balanced modulator or mixer having the diode type mixer tubes 60 and 61 which are supplied with input signals from input transformers 62 and 63. Signals from transformer 62 which may typically be from one of the angle channel intermediate frequency amplifiers 18 or 20 are applied in "push-pull" manner to the anodes of tubes 60 and 61, that is, a positive signal is applied to one anode at the same time the other anode receives a negative signal and vice-versa. Signals from transformer 63 which typically may be the signals from reference channel intermediate frequency amplifier 19, are applied in "push-push" to the anodes of tubes 60 and 61, that is, both anodes receive the same signal from reference amplifier 19 simultaneously. Output signals are filtered by the resistance capacitance circuits 64, 66 and 65, 67 to appear at output terminal 70 for delivery to the appropriate video amplifier (42 or 44).

Details of typical components in the blocked combinations 209—211, 210—212, 214—216 and 215—217, of Fig. 1 are shown in Fig. 4, four circuits of Fig. 4 being employed in the complete system. Input signals from the video amplifier (42 or 44) are applied through coupling transformer 84 in a push-pull manner to control grids of tubes 81 and 82. Tubes 81 and 82 are normally blocked to the positive or negative polarity output signals from the video amplifier (42 or 44) however positive enabling pulse signals applied to terminal 89 and thence to grids 86 and 87 from the delay generator (207 or 213) unblock these tubes for a short interval of time a selected instant of time after the emission of each transmitter pulse signal. Output signals from tubes 81 and 82 are coupled through transformer 85 to full wave rectifier tubes 90 and 91 which are provided with separate filter circuits of which resistances 92 and 93 are components. Filtered signals are applied to the cathode follower-type output tube 94 where they are combined across resistance 96 for delivery to the azimuth servo mechanism 26 (Fig. 1), the elevational servo mechanism 27, the elevation combining circuit 220, or the azimuth combining circuit 221 as the case may be.

An overall system is shown in Fig. 6 containing the control station 250 typically mounted on a shore line. The directive antenna system is indicated by numeral 251. A distant target is the ship 252 and the missile is indicated by numeral 253. Missile 253 has a guidance antenna 254 which receives control signals from the control station 250. Responsive to the control signals, the flight controlling surfaces of missile 253 are adjusted by suitable mechanism to maintain a desired direction of flight.

Missile control systems as thus outlined, involving a radar system wherein extreme accuracy in measuring the angular position of an object relative to the axis of directivity of the antenna, are almost completely divorced of errors due to failure of the antenna mount to track the target exactly. Conventional control systems heretofore available in which guidance of a distant missile is controlled from a radar installation all require actual movement of the antenna to derive missile control signals. In this present system, it has been shown that control of the missile is maintained by the differences in angular relationship of the missile and the target and is not solely dependent upon the direction of the axis of directivity of the antenna.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. In combination with a radio controlled object having radio control circuits located thereon for directing the motion of the object responsive to received signal variations, a control guidance system operative to direct the motion of said radio controlled object with respect to a second object comprising, a highly directive energy transducer system having an axis of directivity, means supplying energy to said transducer system for radiation centered about the axis of directivity, sensing means connected to the transducer system for deriving from the energy reflected from the radio controlled object and the second object, position indicating signals dependent respectively upon the angular positions of the radio controlled object and the second object relative to the transducer axis of directivity, differential signal combining means connected to the last named means for deriving control signals in dependency on differences in the directions of the two objects, and means for varying the emitted energy in accordance with the control signals to direct travel of the radio controlled object.

2. In combination with a radio controlled object having radio control circuits located thereon for directing the motion of the object responsive to received signal variations, a radio control guidance system operative to direct the motion of said radio controlled object for collision with a second object comprising, a highly directive antenna system having an axis of directivity, transmitter means supplying radio frequency energy to said antenna system for radiation centered about the axis of directivity, sensing means connected to the antenna system for deriving from the energy reflected from the radio controlled object and the second object, position indicating signals dependent respectively upon the angular positions of the radio controlled object and the second object relative to the antenna axis of directivity, differential signal combining means connected to the last named means for deriving control signals in dependency on differences in the direction of arrival of energy returned by the two objects, and signal variation means responsive to the control signals operative to vary the energy emitted by the antenna system in dependency on the control signals to direct motion of the first object.

3. In combination with a radio controlled object having radio control circuits located thereon for directing the motion of the object along a radio beam, a radio control guidance system operative to direct the motion of said radio controlled object with respect to a second object comprising, a highly directive energy transducer system having an axis of directivity, means supplying energy to said transducer system for radiation centered about the axis of directivity, sensing means connected to the transducer system for deriving from the energy reflected from the radio controlled object and the second object both elevation and azimuth position indicating signals dependent upon the angular position of the radio controlled object and the second object relative to the transducer axis of directivity, first differential signal combining means connected to receive the azimuthal position indicating signals derived from the energy returned from the rado controlled object and the second object for deriving a beam azimuthal control signal in dependency on the azimuthal differences in the directions of the two objects, second differential signal combining means connected to receive the elevational position indicating signals derived from the energy returned from the radio controlled object and the second object respectively for deriving an elevational control signal in dependency on the differences in the elevational direction of the two objects, and means for varying the azimuthal and elevational orientation of the axis of directivity of the transducer system in accordance with the elevational and azimuthal control signals developed by the two differential signal combining means to direct the travel of the radio controlled object.

4. A radio system for determining relative positions of two sources of incoming radio frequency energy providing energy pulses at different time instants comprising, a directional antenna system providing a confined field of reception including four adjacent zones of reception divergently arranged about an axis of directivity and a fifth zone centered on the axis of directivity, means combining substantially in phase opposition the radio frequency signals simultaneously received by the antenna system from opposing adjacent zones of reception, first and second signal comparing apparatus responsive to the combined signals simultaneously received in opposing zones of reception and in the fifth zone of reception from first and second energy sources to derive resultant energy signals having phase and amplitude dependency on the position of each energy source with respect to the antenna axis of directivity, and signal resolving means providing integrated output signals in dependency on differences between resultant energy signals derived for the two sources.

5. A radio control system for directing the travel of a missile toward a target comprising, a directional antenna system providing a confined field of directivity including four adjacent zones of reception divergently arranged about an axis of directivity and a fifth zone of directivity centered on the axis of directivity, transmitter means connected to the fifth zone of directivity for providing energy radiation centered on the antenna axis of directivity, separate combining means mixing in phase opposition received energy intercepted in zones of reception on opposing sides of the antenna axis of directivity to produce combined signals, signal resolving means connected to said last named means for producing resolved signals dependent on phase relationship between combined signals and signals received in the fifth zone of directivity, first and second gating channels responsive to the resolved signals occurring at selected different time delay with respect to a reference portion of transmitter energy to produce integrated output signals, signal comparing means responsive to the integrated signals from the two gating channels to produce control signals in dependency on differences therebetween, and means operative to vary the energy radiation in accordance with the control signals to direct the travel of the missile.

References Cited in the file of this patent

UNITED STATES PATENTS

| | | |
|---|---|---|
| 2,176,469 | Moueix | Oct. 17, 1939 |
| 2,397,088 | Clay | Mar. 26, 1946 |
| 2,404,942 | Bedford | July 30, 1946 |
| 2,409,462 | Zworykin et al. | Oct. 15, 1946 |
| 2,426,183 | Deloraine et al. | Aug. 26, 1947 |
| 2,448,007 | Ayres | Aug. 31, 1948 |
| 2,462,456 | Bedford | Feb. 22, 1949 |
| 2,480,829 | Barrow et al. | Sept. 6, 1949 |
| 2,480,868 | Marshall | Sept. 6, 1949 |
| 2,557,949 | Deloraine | June 26, 1951 |
| 2,563,998 | Foster | Aug. 14, 1951 |
| 2,703,399 | Williams et al. | Mar. 1, 1955 |
| 2,745,095 | Stoddard | May 8, 1956 |